US011436917B2

(12) United States Patent
Haupt et al.

(10) Patent No.: US 11,436,917 B2
(45) Date of Patent: *Sep. 6, 2022

(54) CENTRAL MONITORING AND MEASUREMENT SYSTEM

(71) Applicant: La Crosse Technology Ltd., La Crosse, WI (US)

(72) Inventors: Rolf Haupt, Chaiwan (HK); Allan McCormick, La Crescent, MN (US)

(73) Assignee: La Crosse Technology Ltd., La Crosse, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/839,647

(22) Filed: Apr. 3, 2020

(65) Prior Publication Data

US 2020/0234568 A1    Jul. 23, 2020

Related U.S. Application Data

(63) Continuation of application No. 14/027,771, filed on Sep. 16, 2013, now Pat. No. 10,657,803, which is a continuation of application No. 12/986,109, filed on Jan. 6, 2011, now Pat. No. 8,539,369.

(60) Provisional application No. 61/292,834, filed on Jan. 6, 2010.

(51) Int. Cl.
  *G08C 19/02*  (2006.01)
  *H04L 12/28*  (2006.01)

(52) U.S. Cl.
  CPC ......... *G08C 19/02* (2013.01); *H04L 12/2816* (2013.01)

(58) Field of Classification Search
  CPC ............................. G08C 19/02; H04L 12/2816
  See application file for complete search history.

(56) References Cited

U.S. PATENT DOCUMENTS

| | | | |
|---|---|---|---|
| 6,327,541 B1* | 12/2001 | Pitchford | G01D 4/004 705/413 |
| 6,335,722 B1* | 1/2002 | Tani | G06F 3/0481 348/208.1 |
| 7,095,424 B2* | 8/2006 | Satoh | G06F 3/012 382/293 |
| 7,142,107 B2* | 11/2006 | Kates | G08B 17/00 340/505 |
| 7,330,886 B2* | 2/2008 | Childers | H04L 43/0817 709/224 |

(Continued)

*Primary Examiner* — Daeho D Song
(74) *Attorney, Agent, or Firm* — Banner & Witcoff, Ltd.

(57) ABSTRACT

A central monitoring and measurement system is described. A central user interface system for generation of a plurality of user-desired information based upon a plurality of measured data, the central user interface system may include a receiver system configured to receive wirelessly the plurality of measured data from a plurality of external sensor systems. An input/output system may be configured to provide output data to a display screen, receive input data from the display device, and provide output data to a processing system. The processing system may be configured to process the plurality of measured data from the plurality of external sensor systems into the plurality of user-desired information. Each external sensor system may include a transmission system configured to transmit wirelessly measured data to the central user interface system, and a measurement system configured to determine the measured data associated with an external device.

20 Claims, 8 Drawing Sheets

(56) References Cited

U.S. PATENT DOCUMENTS

| | | | |
|---|---|---|---|
| 7,379,997 B2* | 5/2008 | Ehlers | G06Q 30/0601 |
| | | | 702/182 |
| 7,460,837 B2* | 12/2008 | Diener | H04B 17/23 |
| | | | 455/39 |
| 7,473,028 B1* | 1/2009 | Alexandrov | G01N 25/4866 |
| | | | 374/10 |
| 7,554,446 B2* | 6/2009 | Ciarcia, Jr. | G08B 13/2417 |
| | | | 340/568.1 |
| 7,606,681 B2* | 10/2009 | Esmaili | G05B 23/0254 |
| | | | 702/182 |
| 7,890,870 B1* | 2/2011 | Metters | H04L 67/535 |
| | | | 345/593 |
| 7,921,459 B2* | 4/2011 | Houston | H04L 43/10 |
| | | | 709/225 |
| 8,131,420 B2* | 3/2012 | Lynch | G01M 7/025 |
| | | | 701/29.4 |
| 8,131,609 B1* | 3/2012 | Hart, Jr. | G06Q 50/06 |
| | | | 705/29 |
| 8,276,087 B2* | 9/2012 | Kim | G09G 5/14 |
| | | | 715/788 |
| 8,384,753 B1* | 2/2013 | Bedingfield, Sr. | H04L 67/535 |
| | | | 348/14.07 |
| 8,466,951 B2* | 6/2013 | Huang | H04N 21/41 |
| | | | 348/14.05 |
| 8,539,369 B2* | 9/2013 | Haupt | H04L 12/2816 |
| | | | 715/737 |
| 10,657,803 B2* | 5/2020 | Haupt | G08C 19/02 |
| 2001/0010525 A1* | 8/2001 | Fukuda | G06F 1/1626 |
| | | | 715/788 |
| 2001/0012344 A1* | 8/2001 | Kwon | H04M 17/02 |
| | | | 379/15.01 |
| 2002/0012323 A1* | 1/2002 | Petite | G08B 25/009 |
| | | | 370/252 |
| 2002/0071139 A1* | 6/2002 | Janik | G06F 3/147 |
| | | | 358/1.15 |
| 2002/0075244 A1 | 6/2002 | Tani et al. | |
| 2003/0000573 A1* | 1/2003 | Yoshioka | A01G 27/003 |
| | | | 137/78.3 |
| 2003/0004652 A1* | 1/2003 | Brunner | G16B 40/20 |
| | | | 702/19 |
| 2004/0162902 A1* | 8/2004 | Davis | H02J 13/00002 |
| | | | 709/227 |
| 2005/0125403 A1* | 6/2005 | Wakabayashi | G08B 21/0423 |
| 2005/0149345 A1* | 7/2005 | Daily | G01D 4/004 |
| | | | 702/61 |
| 2005/0190068 A1* | 9/2005 | Gentry | A61B 5/11 |
| | | | 340/665 |
| 2005/0222933 A1* | 10/2005 | Wesby | H04W 4/20 |
| | | | 705/36 R |
| 2006/0106854 A1* | 5/2006 | Haigh | G08B 21/0423 |
| | | | 707/999.102 |
| 2007/0083294 A1* | 4/2007 | Bruno | G05D 23/1932 |
| | | | 700/295 |
| 2007/0085684 A1* | 4/2007 | Ciarcia, Jr. | G08B 13/248 |
| | | | 340/8.1 |
| 2008/0109387 A1* | 5/2008 | Deaver | G06Q 50/06 |
| | | | 705/412 |
| 2008/0301993 A1* | 12/2008 | Lian | G04G 9/00 |
| | | | 40/700 |
| 2009/0037354 A1* | 2/2009 | Fernandes | G06F 16/9537 |
| | | | 706/45 |
| 2009/0067407 A1* | 3/2009 | Jia | H04L 67/145 |
| | | | 370/350 |
| 2009/0069641 A1* | 3/2009 | Cho | A61B 5/165 |
| | | | 600/300 |
| 2009/0144000 A1* | 6/2009 | Herzig | H02J 13/0062 |
| | | | 702/183 |
| 2009/0157529 A1 | 6/2009 | Ehlers et al. | |
| 2009/0162023 A1* | 6/2009 | Li | H04N 1/0035 |
| | | | 386/248 |
| 2009/0171970 A1* | 7/2009 | Keefe | G06Q 50/06 |
| 2009/0172543 A1* | 7/2009 | Cronin | G06F 3/0485 |
| | | | 715/721 |
| 2009/0216631 A1* | 8/2009 | Ahn | G06Q 30/0254 |
| | | | 705/14.52 |
| 2009/0315869 A1* | 12/2009 | Sugihara | H04N 1/00352 |
| | | | 345/204 |
| 2010/0050108 A1* | 2/2010 | Mirza | G05D 23/1902 |
| | | | 715/780 |
| 2010/0060657 A1* | 3/2010 | Tsai | G06F 3/147 |
| | | | 345/581 |
| 2010/0066647 A1* | 3/2010 | Tatsuta | G11B 27/322 |
| | | | 345/30 |
| 2010/0076835 A1* | 3/2010 | Silverman | G06Q 30/0233 |
| | | | 705/14.33 |
| 2010/0082595 A1* | 4/2010 | Cheng | G06F 16/954 |
| | | | 707/709 |
| 2010/0088366 A1* | 4/2010 | Li | H04N 1/00198 |
| | | | 709/203 |
| 2010/0141656 A1* | 6/2010 | Krieftewirth | G16H 15/00 |
| | | | 600/365 |
| 2010/0171805 A1* | 7/2010 | Ron | H04M 3/44 |
| | | | 348/14.02 |
| 2010/0235144 A1* | 9/2010 | Mosberger-Tang | G01D 4/004 |
| | | | 709/219 |
| 2010/0251181 A1* | 9/2010 | Lal | G06F 3/0488 |
| | | | 345/173 |
| 2010/0289652 A1* | 11/2010 | Javey | G08B 21/20 |
| | | | 340/603 |
| 2011/0010653 A1 | 1/2011 | Wallaert et al. | |
| 2011/0113360 A1* | 5/2011 | Johnson | H04L 12/2825 |
| | | | 340/635 |
| 2011/0185302 A1* | 7/2011 | Kalapodas | G06F 3/0481 |
| | | | 715/771 |
| 2012/0011461 A1* | 1/2012 | Rolf | H04L 12/2816 |
| | | | 715/771 |
| 2014/0015688 A1* | 1/2014 | Haupt | G08C 19/02 |
| | | | 340/870.03 |

* cited by examiner

CENTRAL MONITORING AND MEASUREMENT SYSTEM

The application is a continuation application of U.S. application Ser. No. 14/027,771, filed Sep. 16, 2013, and entitled "Central Monitoring and Measurement System," which is a continuation application of U.S. application Ser. No. 12/986,109, filed Jan. 6, 2011, and entitled "Central Monitoring and Measurement System," now issued as U.S. Pat. No. 8,539,369 on Sep. 17, 2013, which is a non-provisional of U.S. Provisional Patent Application No. 61/292,834, entitled "Central Monitoring and Measurement System," filed Jan. 6, 2010, the contents of each of which are incorporated herein by reference in their entirety for all purposes.

FIELD OF THE TECHNOLOGY

The present disclosure is generally directed to monitoring and measurement devices. More particularly, aspects of the disclosure pertain to central monitoring and measurement systems for receiving data from external sensors and displaying the same in a user interface.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
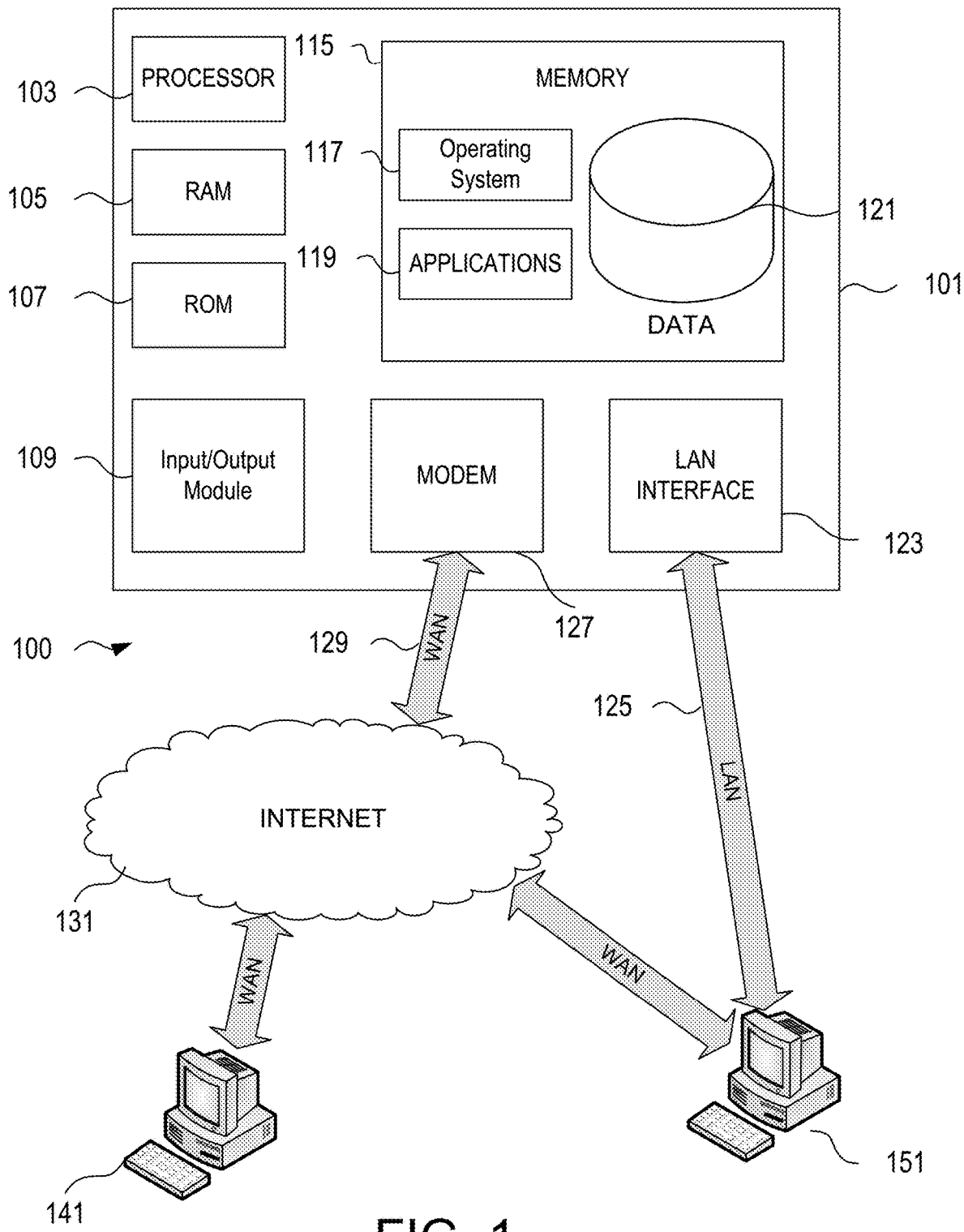
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
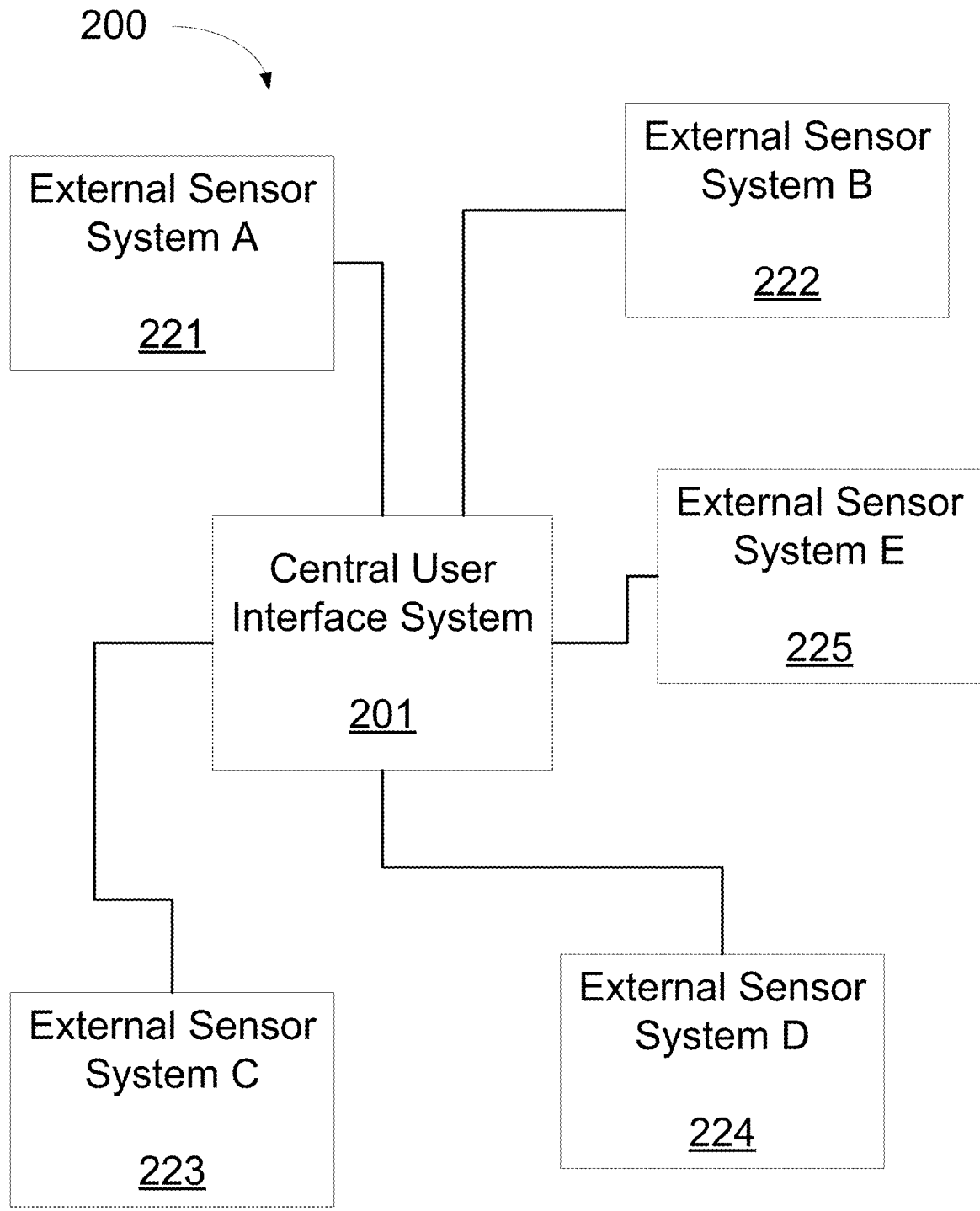
FIG. 2 illustrates a schematic diagram of a system for capturing and processing external sensor measurements in accordance with one of more features described herein.

FIG. 2 illustrates a schematic diagram of a system 200 for capturing and processing external sensor measurements in accordance with one of more features described herein. System 200 includes a central user interface system 201. Central user interface system 201 may be a computer such as described in FIG. 1, configured to receive data from one or more external sensor systems 221-225, process the received data, and output the processed data onto a display screen and/or speakers.

As described in more detail below, central user interface 201 may be configured to wirelessly receive data from one or more external sensor systems 221-225. The received data is representative of some type of measurement data captured by the external sensor system, such as external sensor system A 221. For example, in the case of water usage as described below, the external sensor system may determine and/or directly measure the amount of water usage at a home of a user. Data representative of the amount determined and/or measured, such as 22 gallons, may be wirelessly transmitted to the central user interface system 201. This received data may then be processed by the central user interface system 201 and ultimately outputted in some manner onto a display screen and/or speakers. In the example of water usage, a visual display of "22 Gallons" may be outputted on a display screen of the central user interface system 201.

Central user interface 201 also may be configured to receive user inputs associated with a desired configuration for the output to a display screen. As described in more detail below, measured data from one or more external sensor systems may be processed for output in any of a number of manners for a user onto a display screen. For example, a user may desire to see a trend of electricity usage in a home during a 24-hour period. As such, the output to a display screen may be configured to show a graph of kW usage per specific time period, such as every 10 minutes or every hour. Central user interface 201 may be configured to permit a user to include a number of different outputs on a display screen in any of a number of different manners.

Central user interface system 201 may be configured to operate in conjunction with a digital photo frame, such as an LCD digital photo frame. Central user interface system 201 may be configured to operatively connect with the digital photo frame to output any of the display features described herein on the display screen of the digital photo frame. In an alternative embodiment, central user system 201 may be manufactured as part of a digital photo frame and not removable. As an attachment that may be removed, central user interface system 201 may be adaptable to any of a number of different manufactured digital photo frames.

FIG. 2 shows a number of external sensor systems 221-225 operatively connected to central user interface 201. Each of external sensor systems 221-225 may be configured to determine and/or measure any of a number of different items. For example, for use in a house, external sensor system A 221 may be operatively connected to a water meter of a local water utility company at the house. The external sensor system A 221 may be operatively connected to the water meter and may directly measure water usage and/or receive information from the water meter regarding water usage. This data then may be wirelessly transmitted to the central user interface system 201. As described herein, central user interface system 201 may be an aesthetic digital photo frame in the house of the user. The external sensor system A 221 may be physically outside the house and wireless transmission may be needed to transmit the data to the central user interface system 201.

In another example, external sensor system B 222 may be operatively connected to an electricity meter of a local utility company at the house. The local utility company for electricity may be, and often is, different from the local utility company for water. The external sensor system B 222 may be operatively connected to the electricity meter and may directly measure electricity usage and/or receive information from the electricity meter regarding electricity usage. This data then may be wirelessly transmitted to the central user interface system 201. External sensor system C 223 may be operatively connected to a security camera to provide a streaming view of the captured images and/or may transmit periodic images taken by a security camera. External sensor D 224 may be operatively connected to a security system at a house of a user. External sensor system E 225 may be operatively connected to an outdoor thermometer and/or water gauge where the external sensor system E 225 may be configured to transmit temperature readings and/or rainfall measurements periodically to central user interface system 201.

Each of external sensor system 221-225 may be configured for operation with any of a number of different devices. An external sensor system may be configured to operate with respect to a specific protocol for capturing data from an associated device. A different external sensor system may be configured to operate with a different protocol for a different associated device. Each external sensor system 221-225, as described herein, may include a connection system for specific operation with an associated device. Still further, external sensor system may be configured for operation with two or more associated devices concurrently. For example, if an electricity meter and water meter at the house of a user are physically close to each other, one external sensor system may be operatively connected to each of the associated electricity meter and water meter to capture electricity usage data and water usage data for transmission to a central user interface system.

Figure 3:
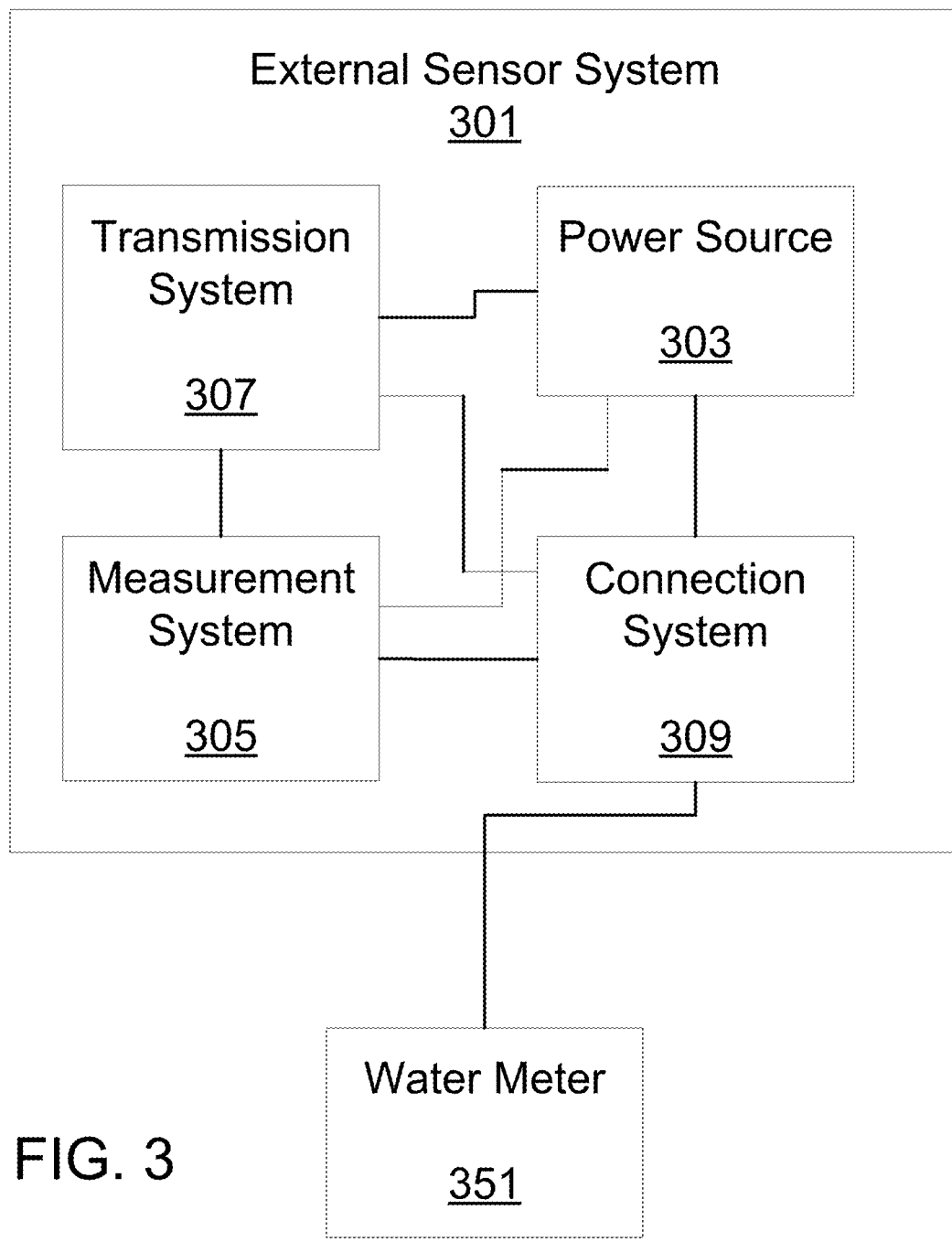
FIG. 3 illustrates a schematic diagram of an external sensor system configured for use with a water meter in accordance with one of more features described herein.

FIG. 3 illustrates a schematic diagram of an external sensor system 301 configured for use with a water meter 351 in accordance with one of more features described herein. External sensor system 301 may be any of external sensor system 221-225 described in FIG. 2. External sensor system 301 includes a power source 303. Power source 303 may be any of a number of circuitries for supplying power for operation of one or more components of external sensor system 301.

For example, power source 303 may include batteries and wiring for supplying power to the other components of the external sensor system 301. In another example, power source 303 may include a solar panel for capturing light and storing energy from the captured light for use in powering one or more components of the external sensor system 301. In still another example, power source 303 may include circuitry to allow for receiving power from an external source. For example, a connection mechanism may be included for connecting to an associated device, such as the water meter 351, to receive power from the water meter 351 to power one or more components of the external sensor system 301. If the water meter 351 includes a power source, such as a battery, the power source 303 of the external sensor system 301 may be configured to operatively connect to the battery to power components of the external sensor system 301. Any of a number of different technologies may be included for operationally connecting to power from an external source.

External sensor system 301 also may include a transmission system 307. Transmission system 307 may include components for transmitting data wirelessly to a central user interface system. Transmission system 307 may be configured to transmit data periodically, such as every 5 minutes or every hour, or may be configured to continuously transmit data to a central user interface system. In the example provided with respect to FIG. 4, when an external sensor system 401 is operatively connected to a security camera 451, the streaming images captured by the video camera 451 may be continuously transmitted by the transmission system 407. Transmission system 307 may be configured to change modes of operation, such as changing time periods for transmission or from periodic transmission to continuous transmission. Data transmission from transmission system 307 is wireless to allow for transmission of data from further distances without the need for direct wiring.

External sensor system 301 is shown to include a measurement system 305. Measurement system 305 may include components for determining and/or directly measuring variables associated with an associated device, such as water meter 351, for eventual transmission to a central user interface. In the example of FIG. 3, a standard water meter 351 may be configured only to measure overall water usage by a user of a house. Measurement system 305 may include circuitry to capture readings of the water meter 351 and/or perform its own measurement of water usage to process and store water usage data. For example, measurement system 305 may be configured to periodically determine and/or measure water usage data and process the data to generate a trend of water usage. Measurement system 305 may be configured to provide data of water usage over a 4 hour period from 6 am-8 am and 8 pm-10 pm when water usage at the house may be greatest during a day. Any of a number of different measurement algorithms and/or calculations may be performed by measurement system 305 to provide a desired variable for eventual transmission to a central user interface.

External sensor system 301 also is shown to include a connection system 309. Connection system 309 may be any of a number of various manners for connecting the external sensor system 301 to an associated device, such as water meter 351. Water meter 351 may include a generic output connection offered by a local utility providing the water meter. The generic output connection may have a specific physical connection and may output specific data in accordance with a specific protocol. Connection system 309 may be configured for use with the output connection of the water meter 351.

As described above, power source 303 may be configured to receive power from an external source, such as water meter 351. In such an example, connection system 309 may be configured to provide the connection for supplying power from water meter 351 to power source 303 of the external sensor system 301. Connection system 309 further may be configured to connect to a source for measurement purposes without directly connecting to an associated measurement device. For example, connection system 309 may be configured for connection to an electrical system of a house without actual connection to an associated electrical meter. In such an example, measurement system 305 may be configured to directly measure variables, such as electricity usage, and power source 303 may be configured to power components of the external sensor system 301 via connection system 309.

Figure 4:
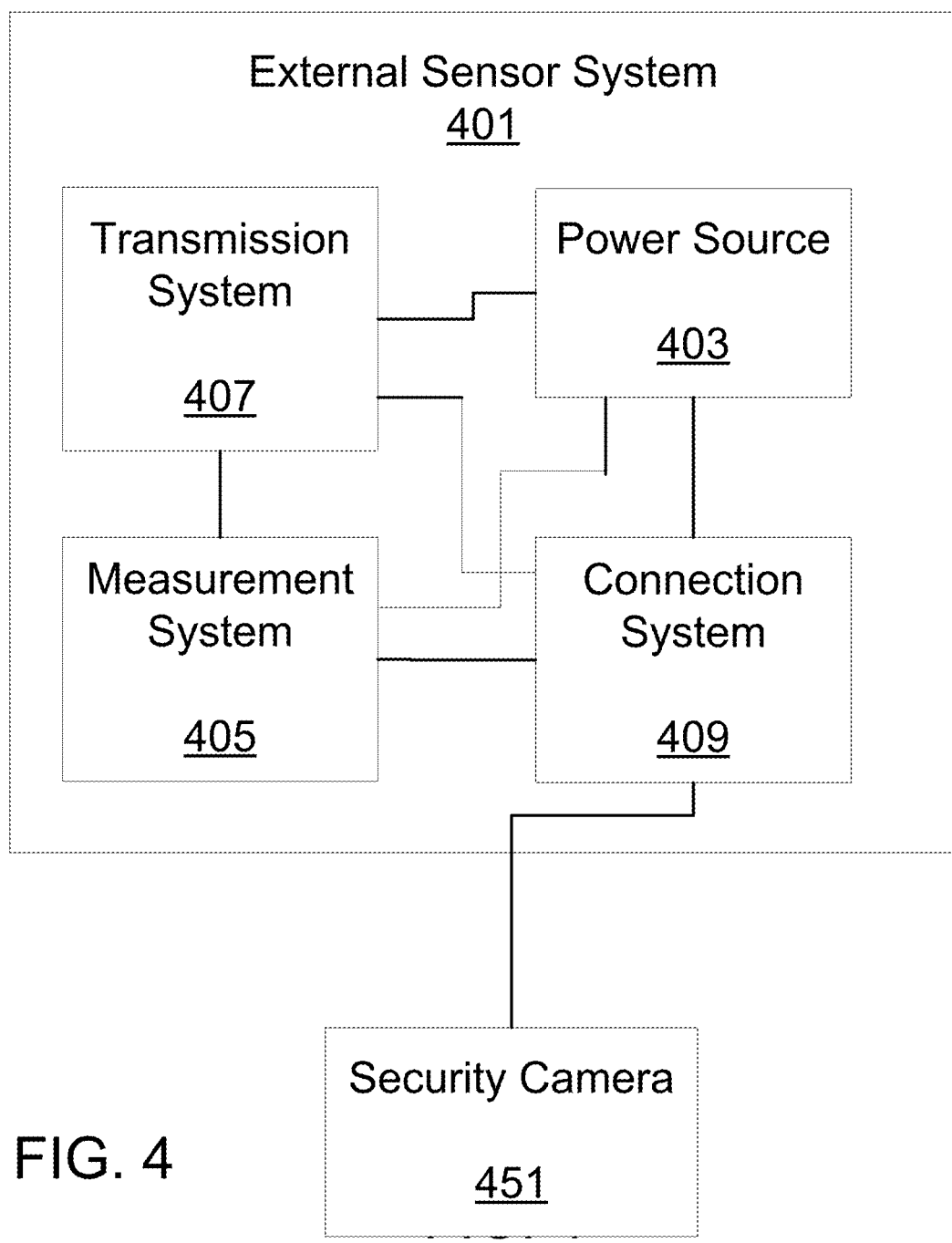
FIG. 4 illustrates a schematic diagram of an external sensor system configured for use with a security camera in accordance with one of more features described herein.

FIG. 4 illustrates a schematic diagram of an external sensor system 401 configured for use with a security camera 451 in accordance with one of more features described herein. External sensor system 401 may be any of external sensor system 221-225 described in FIG. 2. External sensor system 401 includes a power source 403. Similar to power source 303 in FIG. 3, power source 303 may be any of a number of circuitries for supplying power for operation of one or more components of external sensor system 401.

External sensor system 401 also may include a transmission system 407. In the example of FIG. 4, transmission system 407 may include components for continuously transmitting data wirelessly to a central user interface system. When external sensor system 401 is operatively connected to a security camera 451, the streaming images captured by the security camera 451 may be continuously transmitted by the transmission system 407. Transmission system 407 may be configured to change modes of operation, such as changing time periods for transmission or from periodic transmission to continuous transmission. Data transmission from transmission system 407 is wireless to allow for transmission of data from further distances without the need for direct wiring.

External sensor system 401 is shown to include a measurement system 405. Measurement system 405 may include components for determining and/or directly measuring variables associated with an associated device, such as a security camera 451, for eventual transmission to a central user interface. In the example of FIG. 4, measurement system 405 may include circuitry to process data representative of streaming images from security camera 451. Any of a number of different algorithms and/or calculations may be performed by measurement system 405 to provide a desired variable for eventual transmission to a central user interface.

External sensor system 401 also is shown to include a connection system 409. Connection system 409 may be any of a number of various manners for connecting the external sensor system 401 to an associated device, such as security camera 451. Security camera 451 may include a generic output connection offered by a manufacturer of the security camera. The generic output connection may have a specific physical connection and may output specific data in accordance with a specific protocol. Connection system 409 may be configured for use with the output connection of the security camera 451.

As described above, power source 403 may be configured to receive power from an external source, such as security camera 451. In such an example, connection system 409 may be configured to provide the connection for supplying power from security camera 451 to power source 403 of the external sensor system 401.

Figure 5:
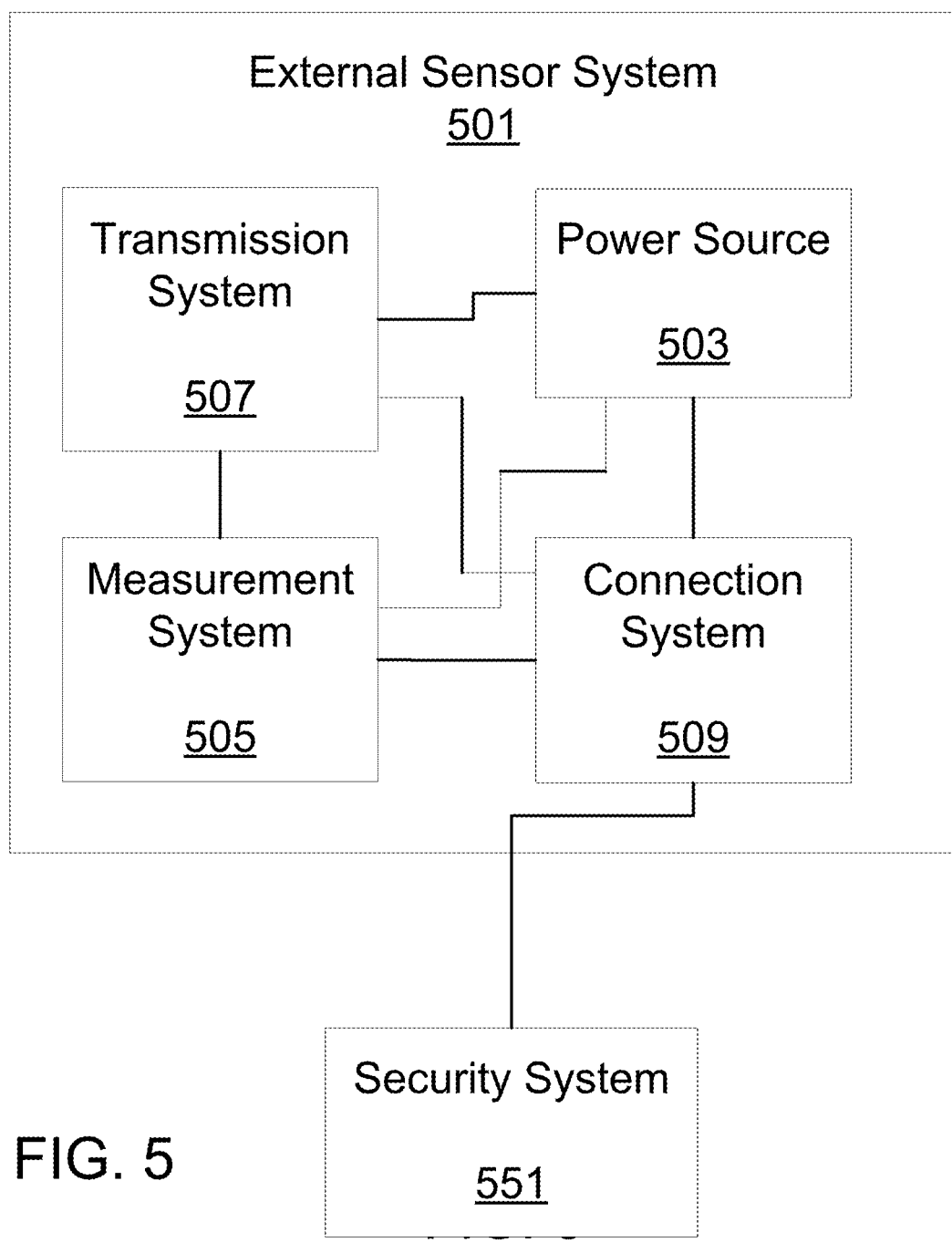
FIG. 5 illustrates a schematic diagram of an external sensor system configured for use with a security system in accordance with one of more features described herein.

FIG. 5 illustrates a schematic diagram of an external sensor system 501 configured for use with a security system 551 in accordance with one or more features described herein. External sensor system 501 may be any of external sensor system 221-225 described in FIG. 2. External sensor system 501 includes a power source 503. Similar to power source 303 in FIG. 3, power source 503 may be any of a number of circuitries for supplying power for operation of one or more components of external sensor system 501.

External sensor system 501 also may include a transmission system 507. In the example of FIG. 5, transmission system 507 may include components for continuously or periodically transmitting data wirelessly to a central user interface system. When external sensor system 501 is operatively connected to a security system 551, events captured by the security system 551 may be continuously or periodically transmitted by the transmission system 507. Transmission system 507 may be configured to change modes of operation, such as changing time periods for transmission or from periodic transmission to continuous transmission. Data transmission from transmission system 507 is wireless to allow for transmission of data from further distances without the need for direct wiring.

Any of a number of events associated with a security system 551 may be processed and transmitted to a central user interface system by a transmission system 507. For example, security system 551 may be configured to detect that a window has been opened or broken or that a door is currently ajar, in such a circumstance, a signal may be sent to security system 551. Such a signal may be captured and/or processed by external security system 501 and representative data of the event may be transmitted to a central user interface system by transmission system 507. Therefore, as describe herein, an output to a display screen of a central user interface system may occur to notify a user of the vent, such as a particular door in the house being open. Any of a number of other events associated with a security system 551 may be processed by external sensor system 501.

External sensor system 501 is shown to include a measurement system 505. Measurement system 505 may include components for determining and/or directly measuring variables associated with an associated device, such as a security system 551, for eventual transmission to a central user interface. In the example of FIG. 5, measurement system 505 may include circuitry to process data representative of streaming images from a security camera after receipt of a signal indicating occurrence of an event by security system 551. Any of a number of different algorithms and/or calculations may be performed by measurement system 505 to provide a desired variable for eventual transmission to a central user interface.

External sensor system 501 also is shown to include a connection system 509. Connection system 509 may be any of a number of various manners for connecting the external sensor system 501 to an associated device, such as security system 551. Security system 551 may include a generic output connection offered by a manufacturer of the security system. The generic output connection may have a specific physical connection and may output specific data in accordance with a specific protocol. Connection system 509 may be configured for use with the output connection of the security system 551.

As described above, power source 503 may be configured to receive power from an external source, such as security system 551. In such an example, connection system 509 may be configured to provide the connection for supplying power from security system 551 to power source 503 of the external sensor system 501.

Figure 6:
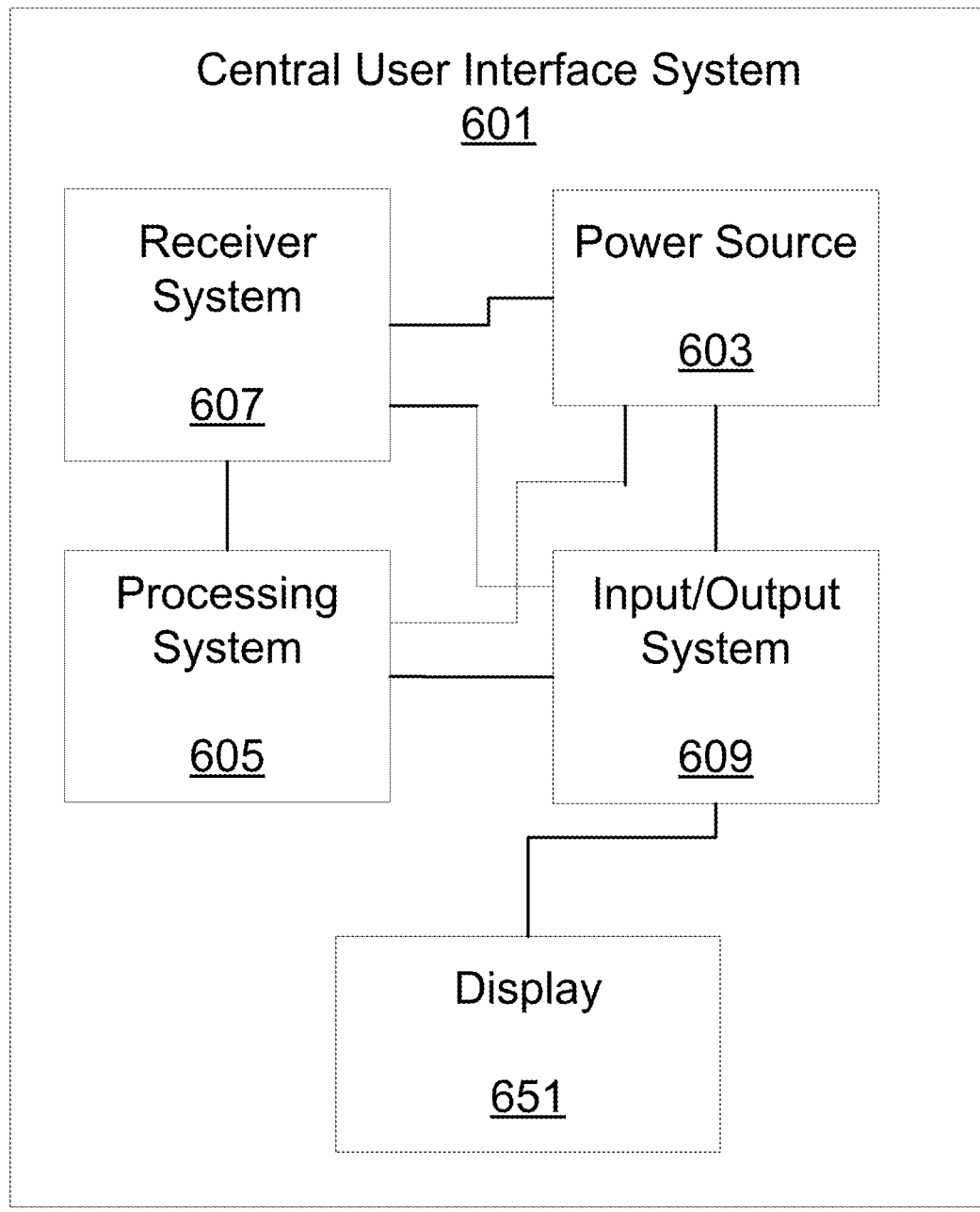
FIG. 6 illustrates a schematic diagram of a central user interface system in accordance with one of more features described herein.

FIG. 6 illustrates a schematic diagram of a central user interface system 601 in accordance with one of more features described herein. Central user interface system 601 may be central user interface system 201 described in FIG. 2. Central user interface system 601 includes a power source 603. Power source 603 may be any of a number of circuitries for supplying power for operation of one or more components of central user interface system 601.

For example, power source 603 may include batteries and wiring for supplying power to the other components of the central user interface system 601. In another example, power source 603 may include a solar panel for capturing light and storing energy from the captured light for use in powering one or more components of the central user interface system 601. In still another example, power source 603 may include circuitry to allow for receiving power from an external source. Any of a number of different technologies may be included for operationally connecting to power from an external source.

Central user interface system 601 also may include a receiver system 607. Receiver system 607 may include components for receiving data wirelessly from one or more external sensor systems. Receiver system 607 may be configured to receive data periodically, such as every 5 minutes or every hour, or may be configured to continuously receive data from one or more external sensor systems. In the example provided with respect to FIG. 4, when an external sensor system 401 is operatively connected to a security camera 451, the streaming images captured by the video camera 451 may be continuously received by a receiver system 607. Receiver system 607 may be configured to change modes of operation, such as changing time periods for reception or from periodic reception to continuous reception. Data reception by receiver system 607 is wireless to allow for reception of data from further distances without the need for direct wiring.

Central user interface system 601 is shown to include a processing system 605. Processing system 605 may include components for processing data received from one or more external sensor systems. In the example of FIG. 2 with five different external sensor systems 221-225 wirelessly transmitting data to central user interface system 201, a processing system of central user interface 201 may be configured to process all of the data received to output in a desired manner to a display 651. For example, processing system may be configured to receive data and generate a trend graph over a period of time to show usage over that period of time. Processing system 605 may be configured to store data of a plurality of measurements over time and then generate a visual graphic for output on display 651.

Processing system 605 may be preconfigured for specific operation and/or may be modified based upon one or more inputs received through input/output system 609. If display 651 is a touch screen display device, a user may enter desired variables to be shown. For example, if central user interface system 601 is configured to receive data wirelessly from five different external sensor systems but a user has enter requests to display only three of those measured data variables, processing system 605 may be configured to generate the desired output for display on display 651 for the three measured data variables while not displaying the other two.

Central user interface system 601 also is shown to include an input/output system 609. Input/output system 609 may be any of a number of various manners for providing output to and receiving input from an associated device, such as display 651. In one example, display 651 may be a touch screen display where a user can make contact with a portion of the display to represent a desired input. In such an example, input/output system 609 may be configured to receive inputs from the touch screen display 651 for processing by the processing system 605 and output to display 651 desired output data. As such, input/output system allows a user to create a specific desired output to a display 651. Input/output system 609 further may include other forms of input and output. For example, and of a number of switches, slide bars, input buttons, output connection ports, speakers, and other input/output devices may be utilized. Input/output system 609 allows a user to create a desired output on display 651.

Figure 7:
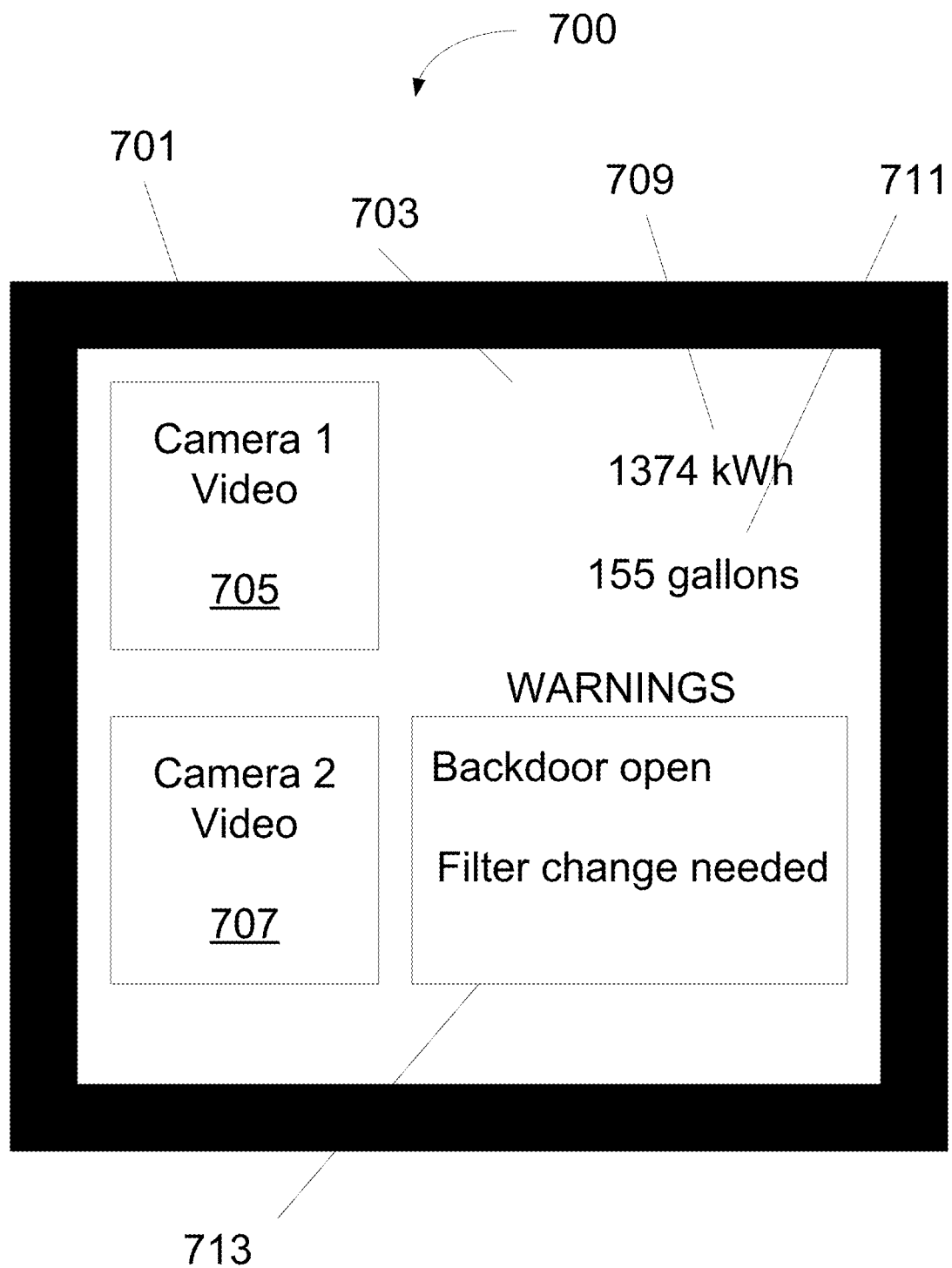
FIG. 7 illustrates a schematic diagram of a central user interface system with a first user interface in accordance with one of more features described herein.

FIG. 7 illustrates a schematic diagram of a central user interface system 700 with a first user interface in accordance with one of more features described herein. FIG. 7 illustrates a system 700 where one or more features described herein are included within or operatively connected to a digital photo frame. Digital photo frame 701 is shown with a display screen 703. FIG. 7 illustrates an example user interface that may be a default configuration or may be a configuration desired by a user of the digital photo frame 701. In this example, data received from multiple external sensor systems is displayed on display screen 703. In this configuration, the upper left portion of the display screen 703 includes a window of a video feed 705 from a first camera. Such a camera may be security camera 451 in FIG. 4. Also shown is a window of a video feed 707 from a second camera. Such a camera may be security camera 451 from FIG. 4 as well. As such, continuous streaming video of the images captured by camera 1 and camera 2 are displayed in windows 705 and 707, respectively. In another example, window 705 may display a continuous streaming video while window 707 may display periodic images from camera 2, such as every five seconds.

In the upper right hand portion of display screen 703 is shown an output measurement 709 of electricity usage. In the example shown, the display shows the current measurement for kWh usage of electricity. Concurrently, total water usage of 155 gallons is shown by an output measurement 711. Measurement data for electricity usage and water usage may be received from the same or different external sensor systems, such as external sensor system 301 shown in FIG. 3. Other measured data also may be shown. Window 713 shows a warnings window of events that may have been detected. As shown, a backdoor open message may be displayed to indicate that a backdoor of the house is currently ajar. In addition, a filter change needed message is shown indicating that a change to the air conditioning filter is needed. Such data may be received from one or more external sensor systems associated with a security system of the house, such as shown in FIG. 5, and/or an external sensor system attached to a heating and air conditioning system of the house. Any of a number of different event messages may be displayed and/or configured for display in accordance with the principles described herein.

Figure 8:
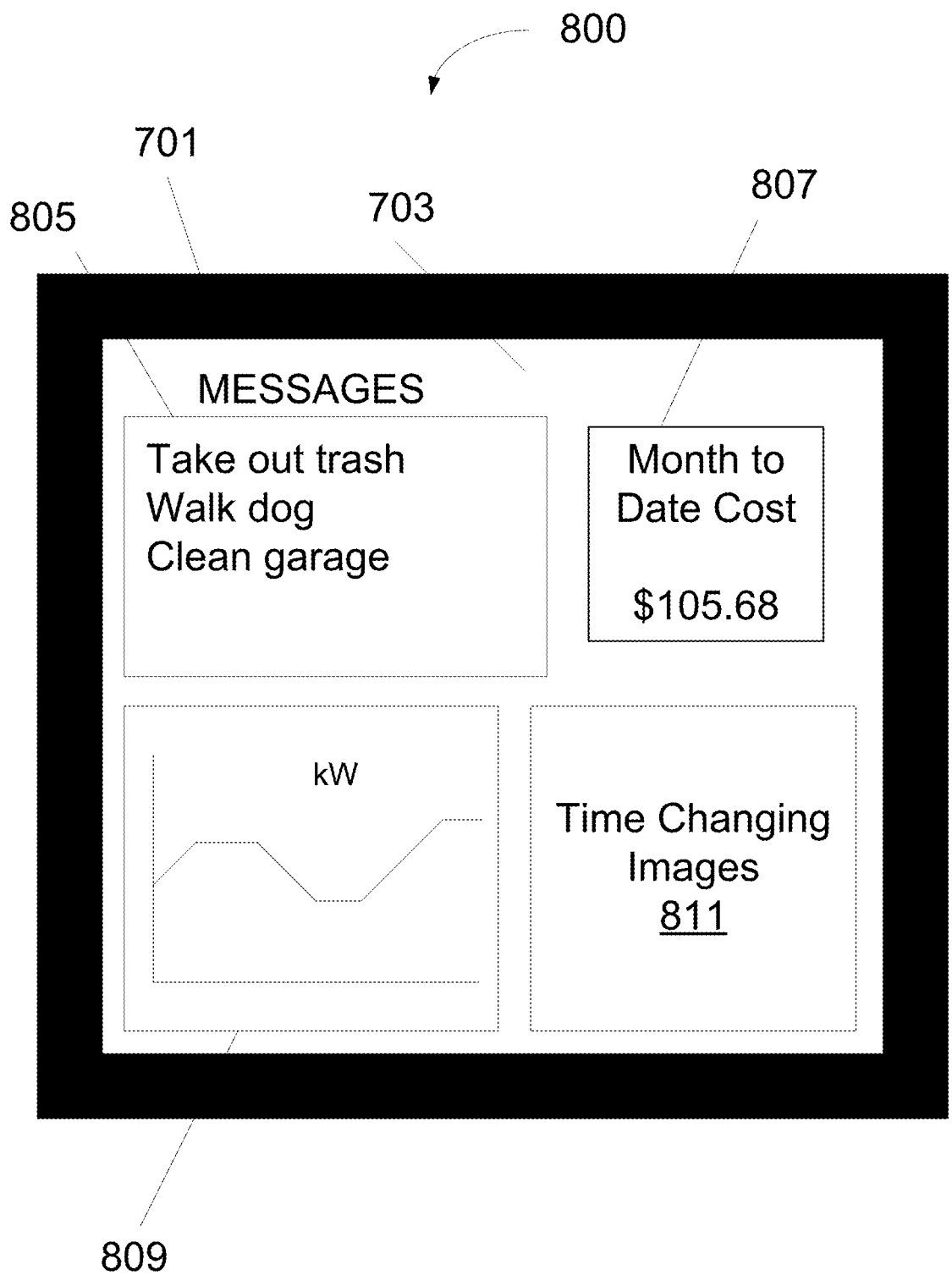
FIG. 8 illustrates a schematic diagram of a central user interface system with a second user interface in accordance with one of more features described herein.

FIG. 8 illustrates a schematic diagram of a central user interface system 800 with a second user interface in accordance with one or more features described herein. FIG. 8 may be the same digital picture frame 701 with display screen 703 but now with a new user interface shown. In this example, a user may have changed the configuration of the output from FIG. 7 to that shown in FIG. 8. In this example, a general message window 805 may be outputted on display screen 703. Utilizing an input/output system of the digital picture frame 701, such as input/output 609 in FIG. 6, a user may enter messages for another user. In this example, chores from a parent to a child may be outputted in window 805. In the lower left portion of display screen 703, a plurality of images may be displayed that change over time in window 811. Similar to the function of a conventional photo frame, stored images may be periodically displayed in window 811, with the images changes after a certain period of time.

Window 809 in the lower left portion of display screen 703 includes a trend graph showing kW usage over a period of time, such as a 24 hour period. As such, a user can see at any time when she is using the most energy in the house in the day. Adjustments by a user may be made in response. Finally, in the example of FIG. 8, the upper right portion of display screen 703 includes a window 807 that may show an approximately month to date cost for utilities in the house. Such information may be very useful to a user to see whether she is approaching a desired threshold for spending on utilities. In response, a user can lower the temperature of the heating, or turning off some unneeded lights in the house. The data displayed in window 807 may be generated from data received from a plurality of external sensor systems. The received data then may be processed by a processing system of the central user interface to display the desired output. In this case, the usage data received from a plurality of external sensor systems may be processed based upon current fees for usage to generate the outputted display of month to date cost of $105.68 for utilities. As should be understood, any of a number of algorithms may be utilized to output a desired display based upon data received from one or more external sensor systems.

One or more components of the central user interface system may exist in different devices. For example, in one embodiment, a standard digital photo frame already may include a receiver system, an input/output system, a processing system, and a power source. A user may insert an attachment into the standard digital photo frame for display of data in a desired manner. Such an attachment may be a small device connected to a memory card slot, such as an SD card slot, of the digital photo frame. The small device may create certain jpeg images with whatever information a user desires to see, including history and graphs. The small attachment device may include appropriate circuitry and components for operating the display of the digital photo frame to display a desired output.

While the disclosure has been described with respect to specific examples including presently preferred modes of carrying out the methods described herein, those skilled in the art will appreciate that there are numerous variations and permutations of the above described systems and techniques. Thus, the spirit and scope of the disclosure should be construed broadly.

What is claimed is:
1. An apparatus comprising:
a display screen; and
a processor configured to:
receive a plurality of sensor data from a plurality of sensors;
receive, via the display screen, a first user input requesting data from a subset of sensors of the plurality of sensors;
output, via the display screen and based on the first user input, a subset of sensor data of the plurality of sensor data;
receive, via a display screen, a second user input requesting first user-desired information, the first user-desired information comprising trend data associated with the plurality of sensor data;
calculate, based on the plurality of sensor data and responsive to receiving the second user input requesting the first user-desired information via the display screen, the first user-desired information;
receive, from a sensor of the plurality of sensors, an event;
generate, based on the event, a notification; and
output, via the display screen, each of one or more user-inputted images, the first user-desired information, and the notification simultaneously.

2. The apparatus of claim 1, wherein the plurality of sensor data is received via one or more wireless transmissions.

3. The apparatus of claim 1, wherein the plurality of sensors comprise one or more of a thermometer or a water gauge.

4. The apparatus of claim 1, wherein the processor is configured to:
output, via the display screen, at least one visual graphic comprising one of a video feed from a camera, a utility usage amount, a measured event warning, or a utility usage cost.

5. The apparatus of claim 4, wherein the at least one visual graphic includes a message window displaying data representative of textual inputs by a user.

6. The apparatus of claim 5, wherein the at least one visual graphic is based upon a specific time period.

7. The apparatus of claim 1, wherein receiving the plurality of sensor data comprises receiving periodically the plurality of sensor data.

8. The apparatus of claim 1, wherein receiving the plurality of sensor data comprises receiving continuously the plurality of sensor data.

9. A system comprising:
a plurality of sensors configured to transmit a plurality of sensor data;
a receiver configured to receive the plurality of sensor data;
a display screen; and
a processor configured to:
receive, via the display screen, a first user input requesting data from a subset of sensors of the plurality of sensors;
output, via the display screen and based on the first user input, a subset of sensor data of the plurality of sensor data;
receive, via a display screen, a second user input requesting first user-desired information, the first user-desired information comprising trend data associated with the plurality of sensor data;
calculate, based on the plurality of sensor data and responsive to receiving the second user input requesting the first user-desired information via the display screen, the first user-desired information;
receive, from a sensor of the plurality of sensors, an event;
generate, based on the event, a notification; and
output, via the display screen, each of one or more user-inputted images, the first user-desired information, and the notification simultaneously.

10. The system of claim 9, wherein the receiver is configured to receive the plurality of sensor data via one or more wireless transmissions.

11. The system of claim 9, wherein the plurality of sensors comprise one or more of a thermometer or a water gauge.

12. The system of claim 9, wherein the processor is configured to:
output, via the display screen, at least one visual graphic comprising one of a video feed from a camera, a utility usage amount, a measured event warning, or a utility usage cost.

13. The system of claim 12, wherein the at least one visual graphic includes a message window displaying data representative of textual inputs by a user.

14. The system of claim 13, wherein the at least one visual graphic is based upon a specific time period.

15. The system of claim 9, wherein receiving the plurality of sensor data comprises receiving periodically the plurality of sensor data.

16. The system of claim 9, wherein receiving the plurality of sensor data comprises receiving continuously the plurality of sensor data.

17. A method comprising:
receiving, by a processing device and via a receiver, a plurality of sensor data from a plurality of sensors;
receiving, by the processing device and via a display screen, a first user input requesting data from a subset of sensors of the plurality of sensors;
outputting, via the display screen and based on the first user input, a subset of sensor data of the plurality of sensor data;
receiving, via the display screen, a second user input requesting first user-desired information, the first user-desired information comprising trend data associated with the plurality of sensor data;
calculating, based on the plurality of sensor data and responsive to receiving the second user input requesting the first user-desired information via the display screen, the first user-desired information;
receiving, from a sensor of the plurality of sensors, an event;
generating, based on the event, a notification;
outputting, via the display screen, a first user-inputted image, the first user-desired information, and the notification for a first period of time; and
upon expiration of the first period of time, outputting, via the display screen, a second user-inputted image, the first user-desired information, and the notification for a second period of time.

18. The method of claim 17, wherein the plurality of sensor data is received via one or more wireless transmissions.

19. The method of claim 17, wherein the plurality of sensors comprise one or more of a thermometer or a water gauge.

20. The method of claim 17, further comprising:
outputting, via the display screen, at least one visual graphic comprising one of a video feed from a camera, a utility usage amount, a measured event warning, or a utility usage cost.

* * * * *